United States Patent
Brock et al.

[15] 3,643,113
[45] Feb. 15, 1972

[54] VOLTAGE-TO-ANALOG PULSE RATE CONVERTER

[72] Inventors: Gordon L. Brock; Charles H. Armstrong, both of Huntington Beach, Calif.

[73] Assignee: Hersey-Sparling Meter Company, El Monte, Calif.

[22] Filed: Mar. 7, 1969

[21] Appl. No.: 805,321

[52] U.S. Cl. .................. 307/271, 328/127, 307/235, 331/177, 307/228
[51] Int. Cl. ..................................................... H03k 4/56
[58] Field of Search ................ 328/127; 331/111, 177; 307/261, 271, 235, 228

[56] References Cited

UNITED STATES PATENTS

| | | | |
|---|---|---|---|
| 2,607,528 | 8/1952 | McWhirter et al. | 328/127 |
| 3,040,273 | 6/1962 | Boff | 328/127 |
| 3,060,388 | 10/1962 | Ball et al. | 331/111 |
| 3,219,945 | 11/1965 | Updike | 333/111 |
| 3,256,426 | 6/1966 | Roth et al. | 328/127 |
| 3,274,501 | 9/1966 | Heinsen | 328/127 |
| 3,386,039 | 5/1968 | Naive | 328/127 |
| 3,422,372 | 1/1969 | Post et al. | 333/111 |
| 3,283,057 | 11/1966 | Campbell | 307/271 |

OTHER PUBLICATIONS

"Period of Sawtooth Ramp Extends to 5 Hours" by Ron Chapman, one page, Reprint from Electronics, June 27, 1966

*Primary Examiner*—Donald D. Forrer
*Assistant Examiner*—Harold A. Dixon
*Attorney*—Donald Diamond

[57] ABSTRACT

A circuit is provided for converting a relatively slowly varying DC voltage value to a proportional repetitive pulse train. The circuit is especially adapted to monitoring some quantity or physical value that can be represented by a direct current input voltage when it is desired to transmit for some distance, the monitored value, without loss of accuracy in the initial measurement. The pulse train can be transmitted without change in frequency to a remote readout device.

1 Claim, 2 Drawing Figures

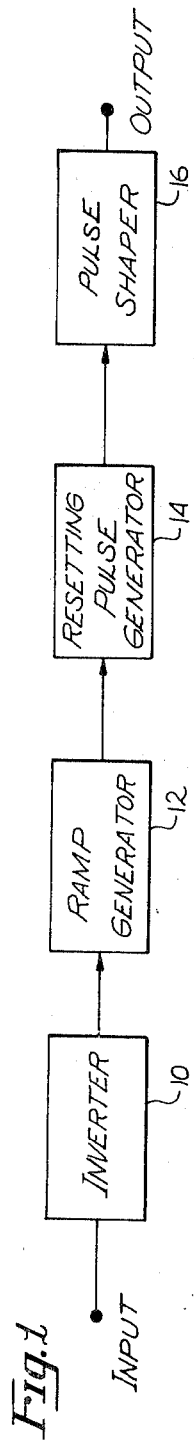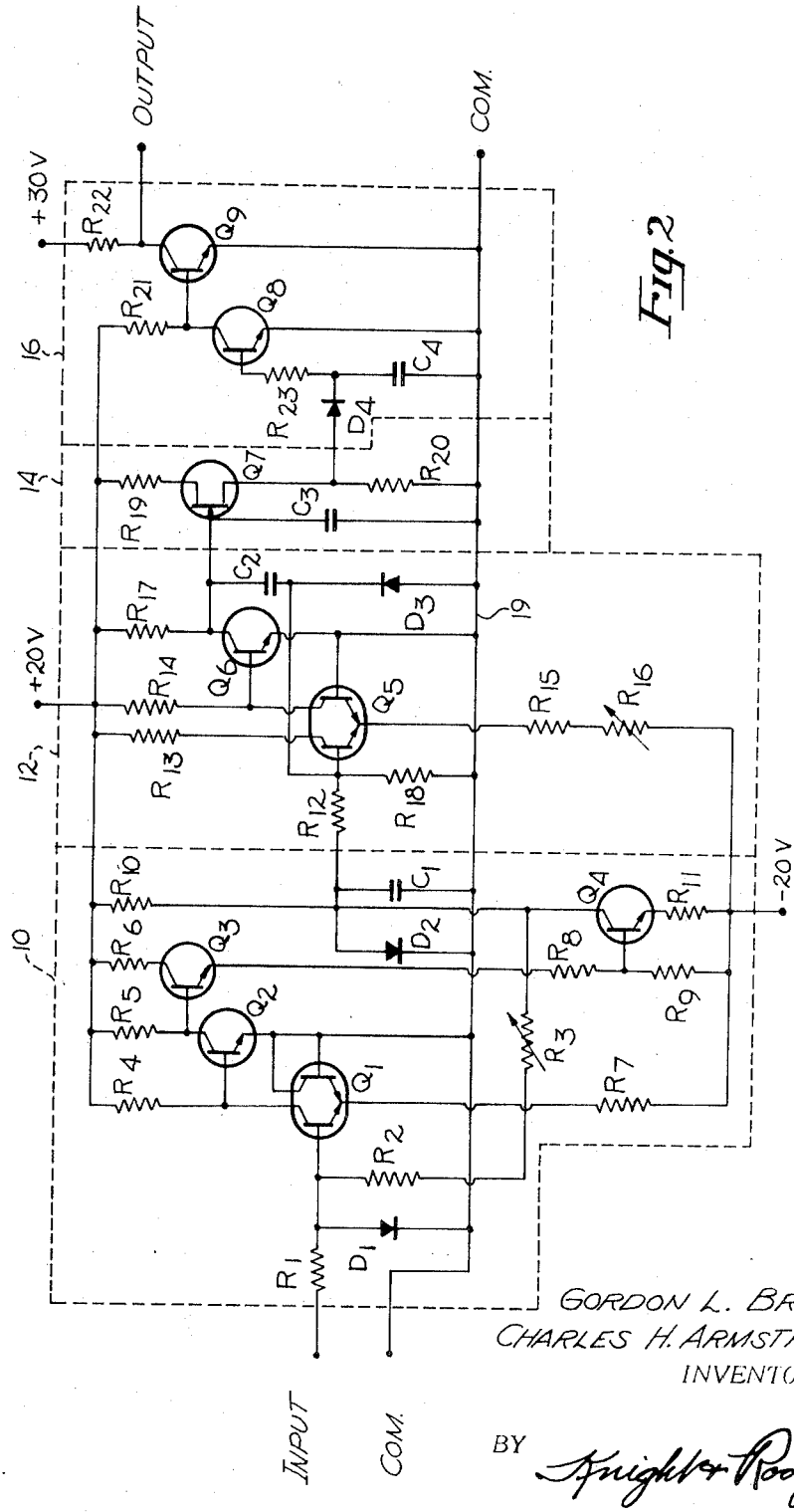

VOLTAGE-TO-ANALOG PULSE RATE CONVERTER

BACKGROUND OF THE INVENTION

The present invention relates generally to electronic voltage to pulse rate converters and more particularly to an electric circuit for generating pulses with a pulse repetition rate substantially directly proportional to a varying input voltage value.

In many telemetering applications, it is desirable to reduce the signal attenuation or other adverse effect of the transmission medium by varying a parameter of the telemetering signal which is independent of the transmission medium. For some applications, this is most easily effected by employing a pulse train as the telemetering signal and varying the repetition rate of the pulses in accordance with the measured quantity. Thus, the transmission medium may distort the shape and amplitude of the individual pulses of the pulse train, but the repetition rate will remain unaffected.

In certain applications, the measured quantity may vary relatively slowly, requiring time periods of the order of hours and minutes for substantial changes to occur. In such cases, it is desirable, for economic reasons, to use the lowest grade transmission medium possible. In order to utilize advantageously such low grade transmission media with pulse-train-type telemetering signals, the pulse repetition rate must be relatively low in order to insure effective transmission of the pulse signal. Additionally, the pulse signal itself must be of sufficient amplitude and of sufficiently long duration that an individual pulse is transmitted through the medium without intolerable distortion of the pulse wave shape.

In the past, electronic circuitry for converting a relatively slowly changing input voltage value to a pulse train output of relatively low pulse repetition rates have in many cases suffered from an internal instability over the relatively long periods of time over which they are operated. To compensate for these internal instabilities, relatively expensive compensating circuitry has been employed which was not actually a part of the converting circuitry.

SUMMARY OF THE INVENTION

To solve the stability problems in electronic circuitry for converting an input voltage value to an output pulse train with a pulse rate substantially directly proportional to the input voltage value, the present invention provides an improved voltage-to-pulse-rate converter. The converter utilizes electronic circuit means which are either inherently relatively self-stabilizing or which operate in a substantially switching mode. The input voltage governs only one of the operating parameters of the electronic circuit means which produces the output pulse train.

A ramp-generating means generates a voltage ramp and the input voltage value determines only the slope of the ramp. When the ramp voltage reaches a predetermined value, the ramp is reset to an initial value by a resetting means. An output pulse is generated in response to resetting of the ramp generating means.

In a presently preferred embodiment of the voltage-to-pulse-rate converter, an operational amplifier connected essentially in an integrating mode is utilized to generate a substantially linear voltage ramp across an integrating capacitor. A resetting means in the form of a threshold voltage sensing circuit utilizing a unijunction transistor is connected across the integrating capacitor to reset the capacitor to an initial value when a predetermined threshold voltage is reached. The pulses generated by the triggering of the unijunction transistor are fed to a pulse shaping circuit to develop output pulses of substantially constant amplitude and duration which are substantially longer than the pulses generated by the triggering of the unijunction transistor.

The repetition rate of the generated pulses is substantially directly proportional to the input voltage value.

BRIEF DESCRIPTION OF THE DRAWING

FIG. 1 is a block diagram of the voltage-to-pulse rate converter embodying the present invention; and FIG. 2 is a schematic diagram of the voltage-to-pulse rate converter.

DESCRIPTION OF A PREFERRED EMBODIMENT

Referring now to the drawing, particularly FIG. 1, the presently preferred embodiment of the voltage-to-pulse rate converter may be conveniently described as comprising four sections. The input voltage is fed to a 1:−1 inverter 10 which not only inverts the polarity of the input voltage but serves to effectively isolate the input terminals from the remainder of the circuitry. The output of the inverter 10 corresponds substantially to the voltage value of the input but is of opposite polarity and is fed to a ramp generator 12. The ramp generator 12 generates a substantially linear voltage ramp with the slope of the ramp determined by the value of the voltage appearing at the output of the inverter 10.

The voltage ramp appearing at the output of the ramp generator is connected to a resetting pulse generator 14 containing a threshold device which resets the voltage ramp to an initial value when the ramp voltage reaches a predetermined level. As the ramp is reset, a pulse substantially coincident in time is generated.

The pulse appearing at the output of the pulse generator 14 is a relatively short spike unsuitable for the low-grade transmission mediums in which the described embodiment of the converter is to be used so the sharp pulse output of the pulse generator is fed to a pulse shaper 16 which changes the sharp pulse to one with a relatively rectangular waveshape of a substantially predetermined height and duration. The height and duration of the output pulse from the pulse shaper 16 are selected to be suitable for transmission through a low-grade transmission medium without suffering distortions severe enough to defeat its utility.

Typically, the described preferred embodiment of the voltage-to-pulse-rate converter is adapted to receive a relatively slowly varying positive DC voltage of from 0 to 8 volts. The output frequency of the converter is variable from 0 to approximately 20 pulses per second and is substantially proportional to the instantaneous input voltage value.

Referring now to FIG. 2, the inverter 10 of the converter is generally an operational amplifier with the input and feedback resistances adjusted so that the gain of the amplifier is substantially unity or one. As will become apparent, the operational amplifier is constructed so that the input voltage is inverted in polarity. Resistor $R_1$ serves as an input resistor to the operational amplifier and the combination of fixed resistor $R_2$ and variable resistor $R_3$ serve as the feedback resistance network. The junctions of input and feedback resistors $R_1$, $R_2$, and $R_3$ are connected to the input of the combination of transistors $Q_1$, $Q_2$, and $Q_3$ and their associated circuitry.

Diode $D_1$ is connected between the junction of the input and feedback resistors $R_1$ and $R_2$, respectively, and the common reference point with the cathode of Diode $D_1$ connected to the common reference point. As is well known, the voltage appearing between the junction of the resistors $R_1$ and $R_2$ and the common reference point of the operational amplifier is substantially zero for proper operation, and this voltage is below the forward voltage drop of $D_1$ so that for normal operation, $D_1$ is not conducting. Should a spike of input voltage appear at the input, however, the operational amplifier may not be able to respond fast enough, and $D_1$ serves as a protection against damage.

Transistors $Q_1$, $Q_2$, and $Q_3$ are connected in a generally known operational amplifier configuration with parallel matched transistor $Q_1$ serving as a differential amplifier driving cascaded direct-coupled transistors $Q_2$ and $Q_3$. Resistors $R_4$, $R_5$, and $R_6$ serve as the collector resistors for one side of $Q_1$, $Q_2$, and $Q_3$, respectively, which are all connected to a 20-volt source of positive potential. Resistor $R_7$ is connected from the common emitter junction of $Q_1$ to a source of 20-volt negative potential, in conformance with generally known operational amplifier configurations.

As the input to the operational amplifier varies only between 0 and 8 volts, the output of the amplifier need vary only between 0 and −8 volts. Therefore, the capability of conventional operational amplifiers of varying both positively and negatively is not needed, and the circuitry needed to generate a positive output voltage has been deleted from the inverter 10 of the preferred embodiment shown.

To this end, $Q_3$ is connected in an emitter-follower configuration with the resistors $R_8$ and $R_9$ forming a voltage-dividing network providing a suitable input to the base of transistor $Q_4$, which is essentially connected to a Class A amplifier with $Q_4$ conducting current through its collector circuit substantially over the entire range of input voltages. Resistor $R_{10}$ is the collector-resistor for $Q_4$ and resistor $R_{11}$ serves as the emitter-biasing resistor. The values of resistors $R_{10}$ and $R_{11}$ as well as the ratio of the resistors $R_8$ and $R_9$ in the voltage divider are adjusted so that when zero input voltage is applied, the output of the operational amplifier appearing at the collector of $Q_4$ is essentially at the common reference level. As the input voltage increases positively, transistor $Q_4$ is driven further into conduction drawing the collector toward the −20-volt source and increasing the negative voltage of the output with respect to the common point.

Diode $D_2$ is connected across the output of the operational amplifier of the inverter to prevent the output from going in a positive direction and capacitor $C_1$ is also connected across the output to filter out any noise form the input voltage or the operational amplifier itself.

The ramp generator 12 of the converter is basically an operational amplifier connected in an integrating configuration with resistor $R_{12}$ as the input resistor and capacitor $C_2$ as the feedback capacitor. The input to resistor $R_{12}$ is connected to the output point of the inverter 10 which is the collector of $Q_4$. Again, the junction of input resistor $R_{12}$ and feedback capacitor $C_2$ is connected to an input base of a parallel matched transistor $Q_5$ connected as a differential amplifier. Collector resistors $R_{13}$ and $R_{14}$ are connected between a 20-volt source of positive potential and the collectors of $Q_5$. A fixed resistor $R_{15}$ and a variable resistor $R_{16}$ serve as the emitter resistor for the commonly connected emitters of $Q_5$. Resistors $R_{15}$ and $R_{16}$ are thus connected in series to a 20-volt source of negative potential. The input base of transistor $Q_6$ is directly connected to one collector of differential amplifier $Q_5$ with resistor $R_{17}$ serving as the collector resistor of $Q_6$.

Feedback capacitor $C_2$ is connected between the output of the operational amplifier which is the collector of $Q_6$, and the input base of $Q_5$. Resistor $R_{18}$ and Diode $D_3$ are connected between the input base of $Q_5$ and the common reference point with the cathode of Diode $D_3$ connected to the input base.

As the negative voltage of a particular value is applied to $R_{12}$ from the inverter 10, the collector of $Q_6$ moves in a positive direction supplying a current which charges capacitor $C_2$. The charging current is applied to the input base of $Q_5$ and a small positive voltage appears across $R_{18}$. Diode $D_3$ is therefore reverse biased when $C_2$ is charging and no current flows through it. The relationship between the current feedback and the gain of the operational amplifier is such that a constant current is applied to capacitor $C_2$ thereby causing a linearly increasing ramp voltage to appear across its terminals.

Following conventional operational amplifier-integrating circuit theory, the slope of the ramp voltage developed across capacitor $C_2$ is substantially directly proportional to the input voltage supplied by the inverter 10. The larger the value of the input voltage, the steeper the slope of the ramp voltage.

The linearly increasing ramp voltage appearing at the collector of $Q_6$ is also applied to the emitter of unijunction transistor $Q_7$. A relatively small capacitor $C_3$ is also connected between the emitter of $Q_7$ and the common reference point to insure proper triggering of $Q_7$. The base-to-base voltage for unijunction transistor $Q_7$ is derived from the 20-volt source of positive potential through a resistor $R_{19}$ to base one of $Q_7$ and a relatively small resistor $R_{20}$ from base two of $Q_7$ to the common terminal point. It will be appreciated that in this configuration, unijunction transistor $Q_7$ functions as a threshold device in that the emitter-to-base two impedance is relatively high until the emitter-to-base two voltage reaches a certain level. At that threshold point, the emitter-to-base two impedance drops sharply and the unijunction transistor $Q_7$ triggers.

When the ramp voltage across $C_2$ plus a relatively small positive voltage appearing across $R_{18}$ reaches the threshold level of $Q_7$, $Q_7$ is triggered and the emitter-to-base two resistance decreases greatly. Capacitor $C_2$ then discharges through the emitter-to-base two junction of $Q_7$ through $R_{20}$ and Diode $D_3$, which causes Diode $D_3$ to be forward biased. Capacitor $C_3$ also discharges through the emitter-to-base two junction of $Q_7$ and resistor $R_{20}$, but as capacitor $C_3$ is relatively small in value compared to capacitor $C_2$, capacitor $C_2$ essentially controls the discharge rate.

As is well known, a capacitor discharging through the triggered emitter-to-base two junction of a unijunction transistor would create a relatively short and peaked current pulse through resistor $R_{20}$ generating a voltage pulse across that resistor. As this pulse is of too short a duration to be transmitted efficiently through a low-grade transmission medium, the short duration pulse is fed to the pulse shaper 16. The pulse shaper 16 generates a pulse of considerably higher voltage and considerably longer duration in response to the output pulse from the triggered unijunction transistor $Q_7$.

The pulse shaper 16 is basically a direct coupled amplifier utilizing transistors $Q_8$ and $Q_9$. The collector resistor $R_{21}$ of $Q_8$ is connected to the 20-volt source of positive potential and the collector resistor $R_{22}$ of $Q_9$ is connected to a 30-volt source of positive potential. The emitters of both transistors $Q_8$ and $Q_9$ are connected to the common reference point. The output of the amplifier is derived between the collector of $Q_9$ and the common reference point.

The input circuit for the pulse shaper is a resistor $R_{23}$ in series with a capacitor $C_4$ connected between the input base of $Q_8$ and the common reference point. The output pulse from the triggered unijunction transistor $Q_7$ is fed to the junction of $R_{23}$ and $C_4$ through a Diode $D_4$.

The gain of $Q_8$ is such that when the pulse through Diode $D_4$ charges capacitor $C_4$, the current through $R_{23}$ from $C_4$ and the base emitter junction of $Q_8$ is more than sufficient to saturate transistor $Q_8$, dropping its collector voltage near that of the common reference point. This in turn cuts off transistor $Q_9$ thus raising the voltage at the output terminal to substantially the 30-volt positive source. It will be appreciated that the leading slope of the positive going output pulse is substantially coincident with the pulse derived from the triggered unijunction $Q_7$.

The current required to maintain $Q_8$ in saturation is quite low and capacitor $C_4$, while discharging, maintains $Q_8$ in saturation for a longer period of time than the duration of the pulse derived from the unijunction transistor $Q_7$. The configuration of the latter pulse for the preferred embodiment illustrated is approximately 20 milliseconds. Also, the small amount of current needed to maintain $Q_8$ in saturation is such that the rate of change of the current from discharging capacitor $C_4$ is high enough so that the time required to turn transistor $Q_8$ off once it has begun conducting is relatively short compared to the length of time that $Q_8$ is saturated. Therefore, the waveshape of the output pulse appears substantially rectangular in shape.

To adjust the voltage-to-pulse rate converter for proper operation, the input voltage is set at zero, and variable resistor $R_{16}$ is adjusted so that no voltage ramp is generated by the ramp generator 12. The input voltage is then set at some predetermined value and feedback resistor $R_3$ in the inverter 10 operational amplifier is adjusted so that the output pulse repetition rate is proportional to the predetermined input voltage.

Typical component values for the voltage-to-pulse-rate converter are as follows:

| | |
|---|---|
| $Q_1$ | 2N2223 A (or matched pair of 2N3565) |
| $Q_2$ | 2N3565 |
| $Q_3$ | 2N3569 |
| $Q_4$ | 2N3569 |
| $Q_5$ | 2N2223 A (or matched pair of 2N3565 |
| $Q_6$ | 2N3565 |
| $Q_7$ | 2N2646 |
| $Q_8$ | 2N3565 |
| $Q_9$ | 2N3565 |
| $D_1$ | 1N914 |
| $D_2$ | 1N914 |
| $D_3$ | 1N914 |
| $D_4$ | 1N914 |
| $C_1$ | 10 mfd. (25wv) |
| $C_2$ | 3.3 mfd. (35wv) |
| $C_3$ | 0.1 mfd. (100wv) |
| $C_4$ | 0.047 mfd. (25wv) |
| $R_1$ | 10k ohms |
| $R_2$ | 8.2k ohms |
| $R_3$ | 5k ohms (pot) |
| $R_4$ | 150k ohms |
| $R_5$ | 10k ohms |
| $R_6$ | 470 ohms |
| $R_7$ | 68k ohms |
| $R_8$ | 15k ohms |
| $R_9$ | 470 ohms |
| $R_{10}$ | 4.7k ohms |
| $R_{11}$ | 47 ohms |
| $R_{12}$ | 12k ohms |
| $R_{13}$ | 10k ohms |
| $R_{14}$ | 150k ohms |
| $R_{15}$ | 68k ohms |
| $R_{16}$ | 10k ohm (pot) |
| $R_{17}$ | 8.2k ohms |
| $R_{18}$ | 1k ohm |
| $R_{19}$ | 470 ohms |
| $R_{20}$ | 10 ohms |
| $R_{21}$ | 82k ohms |
| $R_{22}$ | 4.7k ohms |
| $R_{23}$ | 100k ohms |

It will be understood that while the presently preferred embodiment of the invention has been described and illustrated, modifications of design and construction can be made without departing from the spirit and scope of the invention. Therefore, the above description of a specific embodiment is considered to be illustrative of rather than limitative upon the invention disclosed herein.

We claim:

1. An electrical circuit for generating uniform repetitive output pulses having a repetition rate analogous to an input voltage level, said circuit comprising: electrical integrating means for integrating said input voltage level to produce a voltage ramp having a slope substantially proportional to said input voltage level said integrating means including an operational amplifier having input and output terminals and a common reference terminal, said operational amplifier having a capacitor connected between said output and input terminals, said operational amplifier further having a first resistor connected between said input terminal and a second resistor connected between said input terminal and said common reference terminal, said operational amplifier further having a diode with its anode connected to said input terminal and its cathode connected to said common reference terminal;

means for resetting said voltage ramp of said integrating means to an initial value when said voltage ramp reaches a predetermined voltage level said resetting means including a unijunction transistor having an emitter and first and second bases, said first base being connected to a source of positive potential through a third resistor and said second base being connected to said common reference terminal through a fourth resistor, the emitter of said unijunction transistor being connected to said output terminal of said operational amplifier for discharging said capacitor at least initially through said diode, the emitter-to-base two circuit of said unijunction transistor and said fourth resistor when the voltage across said capacitor reaches the predetermined emitter threshold voltage of said unijunction transistor; and means responsive to the resetting of said voltage ramp for generating an output pulse having a predetermined wave shape.

* * * * *